(12) United States Patent
Fu et al.

(10) Patent No.: US 7,519,488 B2
(45) Date of Patent: Apr. 14, 2009

(54) SIGNAL PROCESSING METHOD AND SYSTEM FOR NOISE REMOVAL AND SIGNAL EXTRACTION

(75) Inventors: Chi Yung Fu, San Francisco, CA (US); Loren Petrich, Lebanon, OR (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 214 days.

(21) Appl. No.: 11/142,049

(22) Filed: May 31, 2005

(65) Prior Publication Data

US 2005/0265629 A1 Dec. 1, 2005

Related U.S. Application Data

(60) Provisional application No. 60/575,315, filed on May 28, 2004.

(51) Int. Cl.
*G06F 19/00* (2006.01)
*G01R 13/00* (2006.01)
*G01R 29/26* (2006.01)

(52) U.S. Cl. ................... 702/69; 702/179; 702/191; 706/14; 706/15; 375/240.19

(58) Field of Classification Search ............ 702/69–71, 702/179, 189–191; 382/240, 232–253; 706/14–16; 375/240.19
See application file for complete search history.

(56) References Cited

U.S. PATENT DOCUMENTS

| | | | |
|---|---|---|---|
| 5,825,936 A * | 10/1998 | Clarke et al. | ................. 382/261 |
| 6,763,322 B2 * | 7/2004 | Potyrailo et al. | ............ 702/189 |
| 6,763,339 B2 | 7/2004 | Fu et al. | |
| 6,947,915 B2 * | 9/2005 | Liang et al. | ................... 706/25 |
| 6,957,172 B2 * | 10/2005 | Wegerich | ................... 702/189 |
| 7,085,436 B2 * | 8/2006 | Akhan et al. | ................ 382/298 |

OTHER PUBLICATIONS

Wu et al., 'Automatic Digital Modulation Recognition Using Wavelet Transform and Neural Networks', 2004, HIT, pp. 936-940.*

(Continued)

*Primary Examiner*—Edward Raymond
*Assistant Examiner*—Elias Desta
(74) *Attorney, Agent, or Firm*—James S. Tak; John H. Lee (57) ABSTRACT

A signal processing method and system combining smooth level wavelet pre-processing together with artificial neural networks all in the wavelet domain for signal denoising and extraction. Upon receiving a signal corrupted with noise, an n-level decomposition of the signal is performed using a discrete wavelet transform to produce a smooth component and a rough component for each decomposition level. The $n^{th}$ level smooth component is then inputted into a corresponding neural network pre-trained to filter out noise in that component by pattern recognition in the wavelet domain. Additional rough components, beginning at the highest level, may also be retained and inputted into corresponding neural networks pre-trained to filter out noise in those components also by pattern recognition in the wavelet domain. In any case, an inverse discrete wavelet transform is performed on the combined output from all the neural networks to recover a clean signal back in the time domain.

13 Claims, 7 Drawing Sheets

OTHER PUBLICATIONS

Elarbi et la., 'A Novel Approach Using Neural Network with Wavelet Coefficients, for Image Watermarking', 2004, IEEE Publication, pp. 1-7.*

C. Fu et al, "Intelligent Signal Processing for Detection System Optimization." Analytical Chemistry, pp. EST. 6.8, A-G. Jun. 28, 2004.

E. Collantes et al, "Preprocessing of HPLC Trace Impurity Patterns by Wavelet Packets for Pharmaceutical Fingerprinting Using Artificial Neural Networks." Analytical Chemistry, vol. 69, No. 7, Apr. 1, 1997.

S. Bell et al, "Classification of ion mobility spectra by Functional groups using neural networks." 1999 Elsevier Science B.V. pp. 121-133.

C. Cai et al, "Prediction of Substructure and Toxicity of Pesticides with Temperature Constrained-Cascade Correlation Network from Low-Resolution Mass Spectra." Analytical Chemistry, vol. 71, No. 19, Oct. 1, 1999. Published on Web Aug. 26, 1999. pp. 4134-4141.

M. Jalali-Heravi et al, "Use of Self-Training Artificial Neural Networks in Modeling of Gas Chromatographic Relative Retention Times of a Variety of Organic Compounds." 2002 Elsevier Science B.V. Journal of Chromatography A, 945 (2002) 173-184.

S. Voisin et al, "Pyrolysis Patterns of 5 Close Corynebacterium Species Analyzed by Artificial Neural Networks." Antonie van Leeuwenhoek 85: 287-296, 2004.

J. Hernandez-Borges et al, "Content of Aliphatic Hydrocarbons in Limpets as a New Way for Classification of Species Using Artificial Neural Networks." Chemosphere 54 (2004) 1059-1069.

M. H. Fatemi, "Simultaneous Modeling of the Kovats Retention Indices on OV-1 and SE-54 Stationary Phases using Artificial Neural Networks." 2002 Published by Elsevier Science B.V. pp. 273-280.

* cited by examiner

| Threshold | LLNL Processing (# of Peaks found) | | | Traditional Processing | | | LLNL Avg(3 runs) (# of Peaks found) | Traditional Avg(2 runs) | LLNL FALSE | Traditional FALSE | Diff |
|---|---|---|---|---|---|---|---|---|---|---|---|
| O Series | | | | | | | | | | | |
| 1.00E-05 | 13 | 13 | 10 | 196 | 240 | | 12 | 218 | 3 | 209 | 206 |
| P Series | | | | | | | | | | | |
| 1.00E-05 | 10 | 18 | 11 | 187 | 235 | | 13 | 211 | 4 | 202 | 198 |
| Q2 Series | | | | | | | | | | | |
| 1.00E-05 | 12 | 7 | 12 | 218 | 212 | | 10 | 215 | 1 | 206 | 205 |
| R Series | | | | | | | | | | | |
| 1.00E-05 | 18 | 14 | 13 | 247 | 206 | | 15 | 227 | 6 | 218 | 212 |
| | | | | | | Ave | | | 3.5 | 209 | 205 |

Fig. 10

SIGNAL PROCESSING METHOD AND SYSTEM FOR NOISE REMOVAL AND SIGNAL EXTRACTION

I. CLAIM OF PRIORITY IN PROVISIONAL APPLICATION

This application claims priority in provisional application No. 60/575,315, filed on May 28, 2004, entitled "Smooth Level Wavelet Pre-Processing Combined with Artificial Neural Network for Signal Extraction" by Chi Yung Fu et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to signal processing, and more particularly to a signal processing method and system combining smooth level wavelet pre-processing together with artificial neural networks all in the wavelet domain for signal extraction.

III. BACKGROUND OF THE INVENTION

Sensors or instrumentation deployed in real-world settings for various research fields, e.g. analytical chemistry, and using various detection modalities, e.g. gas chromatography, mass spectrometry, radiation detection, etc., usually produce signals corrupted by various types of noise. As a result, noise removal is a fundamental prerequisite for accurate data extraction, analysis, and interpretation, as well as effective storage/transmission. For example, noisy data would make data compression much harder and thus affect the issues of storage and transmission. If not done well, the preprocessing inherent in any instrument design can eliminate valuable information, and subsequent use of advanced signal processing methods, no matter how capable, will not be able to recover signal lost by crude pre-processing.

The techniques of wavelet transform and artificial neural network processing are each separately known in the prior art for cleaning up corrupted signals or to extract relevant information, and several notable publications are listed in the References Cited section. For example, respective publications by Voisin and Hernandez-Borges reported processing the spectra by neural networks to identify bacteria based on certain identifiers such as the concentration of n-alkanes or fatty acids as measured by gas chromatography. Additionally, respective publications by Fatemi and Jalali-Heravi reported using artificial neural networks to learn from certain chemical parameters such as molecular weights and energy levels of the highest occupied molecular orbitals, to predict retention indices or retention time. And respective publications by Bell and Cai reported using the spectra as inputs to the neural network for chemical classification such as level of toxicity or active substructures. Two examples using both wavelet transforms and artificial neural networks on chromatography, are disclosed in the respective publications by Collantes and Schirm, also listed in the References Cited section. Collantes reported using wavelets and neural networks on HPLC data for the classification of L-tryptophan from six different manufacturers. In particular a wavelet package (a combination of wavelets and an oscillating function) was used and not pure wavelets. And a relatively straightforward backpropagation neural network is used for the purpose of classification. Schirm reported using a combination of wavelet processing and neural network for quality assurance of pentosan polysulfate based on fingerprint electropherograms. Cofflet wavelets were used to preprocess the electrophoresis data. A combination of mid-level transforms was used to yield the best results for baseline and noise considerations. And a simple backpropagation neural network was used with wavelet processed data as input, for the purpose of classification and not trace signal extraction, i.e. extracting trace peaks.

Another example of a signal processing system and method using both wavelets and neural network processing is attributed to Applicants' research performed for the Lawrence Livermore National Laboratory, as disclosed in U.S. Pat. No. 6,763,339. In that patent, signal denoising is performed using wavelet processing which incorporates automatic thresholding methods followed by using a single neural network for shape-matching to extract all relevant patterns. In that technique, the neural network processing is performed in the time domain, and a single neural network is used to extract all the patterns and therefore must be pre-trained to recognize all relevant patterns.

What is still needed therefore is an efficient and more effective signal denoising and extraction technique using a combination wavelet-neural network signal processing generally applicable to a variety of research fields and modes of detection. In this manner, such a technique would enable the recovery of valuable information which may be otherwise lost to high levels of noise

IV. SUMMARY OF THE INVENTION

One aspect of the present invention includes a signal processing method comprising: receiving a signal corrupted with noise; performing an n-level decomposition of said signal using a discrete wavelet transform to produce a smooth component and a rough component for each decomposition level; inputting the $n^{th}$ level smooth component into a corresponding neural network pre-trained to filter out noise in said component by pattern recognition in the wavelet domain; and performing an inverse discrete wavelet transform on output from the neural network to recover a clean signal.

Another aspect of the present invention includes a signal processing method comprising: receiving a signal corrupted with noise; decomposing the signal into a plurality of signal components using a predetermined transform; inputting each of the plurality of decomposed signal components into a corresponding neural network pre-trained to filter out noise in the signal component by pattern recognition in the transform domain; and performing an inverse transform on output from the neural networks to recover a clean signal in the time domain.

Another aspect of the present invention includes a system comprising: a discrete wavelet transformer capable of iteratively decomposing a signal into a plurality of decomposition levels each having a smooth component and a rough component; at least one neural network(s) corresponding in number to a set of pre-selected components comprising a highest-level smooth component and a predetermined number of rough components, each neural network operatively coupled to the discrete wavelet transformer to receive a corresponding one of the pre-selected components, and pre-trained to filter noise in the wavelet domain from a corresponding one of the pre-selected components via pattern recognition techniques; and an inverse discrete wavelet transformer capable of recovering a clean signal in the time domain from the combined outputs of the plurality of neural networks.

V. BRIEF DESCRIPTION OF THE DRAWINGS

The accompanying drawings, which are incorporated into and form a part of the disclosure, are as follows.

VI. DETAILED DESCRIPTION OF THE PREFERRED EMBODIMENTS

Generally, the present invention is directed to an intelligent signal processing method and system capable of extracting trace signals embedded in high levels of noise. In particular, the present invention is a denoising and signal extraction technique based on a combination of discrete wavelet decomposition and the use of one or more artificial neural networks, with each network pre-trained for processing a corresponding wavelet component in the wavelet domain. The wavelet decomposition generally serves to segment the data into smaller subsets, i.e. wavelet components, each of a different size scale. By using one or more (but not all) of the wavelet components for subsequent processing, the signal may be separated from the noise coming from instrumentation and/or the detector so that it is more amenable to interpretation by signal interpretation methods, such as chemometrics and other techniques for separating a signal into its constituent parts. Furthermore, within each scale of the decomposed wavelet components, the patterns may be simpler and thus may lend themselves to easier learning by the neural networks. Thus the use of multiple neural networks serves to separately process, i.e. filter by pattern recognition, the decomposed wavelet components for maximizing system performance. Such a divide and conquer technique enables a more effective signal extraction technique, and addresses the issue of overburdening a single neural network to extract all the patterns.

Figure 1:
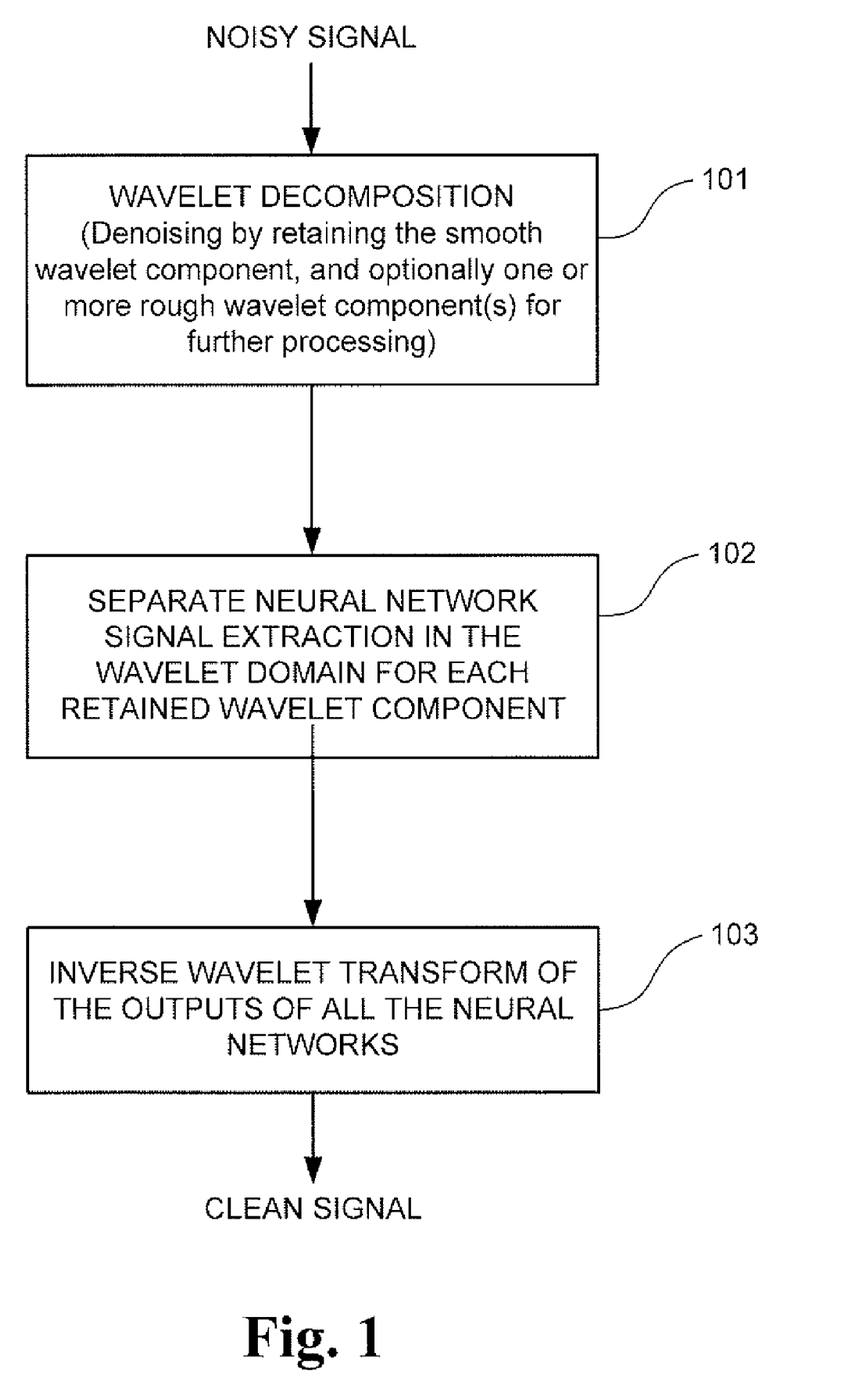
FIG. 1 is a functional block diagram of a preferred embodiment of a signal preprocessing method and system of the present invention for extracting signals from noisy data.

The signal extraction process of the present invention can be summarized by the following sequence of operations: (a) discrete wavelet decomposition into a plurality of wavelet components, (b) using separate neural networks for signal extraction working in the wavelet domain for each retained wavelet component, and (c) applying an inverse wavelet transform to the outputs of all the neural networks to return a clean signal in the time domain. This sequence of operations is shown in FIG. 1. Incoming noisy data is first transformed and segmented by wavelet decomposition at step 101 into wavelet components of different scales. A certain amount of noise may be rejected by keeping/retaining only the smoothest wavelet component or components to be passed on for further pre-processing. However, one or more rough wavelet components may also be retained for further pre-processing. It is appreciated that other conventional denoising techniques may also be employed. At step 102, each of the retained wavelet component(s) is then inputted into its corresponding pre-trained neural network for the purpose of extracting the relevant patterns in the wavelet domain. All the results from the neural networks are then inverted through an inverse wavelet transform at step 103 back into a clean signal in the time domain. Though not shown in the figures, background or other long-scale-length variations may be additionally removed (removal of baseline) through, for example, spline-fitting. The subtraction of baseline is an iterative correction procedure that can save the neural network from having to learn the long term effect which can be different from run to run so that the neural network can "concentrate" on learning the features of the peaks.

With respect to step 101, wavelet decomposition is preferably performed using discrete wavelet transform. The discrete wavelet transform (hereinafter "DWT") provides sufficient information for both analysis and reconstruction of the original signal with significant reduction in computations. DWT is a form of multiresolution analysis, which provides an effective balance between the resolution requirement and the computational loading. Instead of using some thresholding techniques to eliminate noise as often done for denoising for either wavelet or Fourier transforms, the inherent decimation procedure of DWT is used to eliminate noise in the present invention as follows. A simple discrete wavelet transform produces two sets of data from an original one: a "smooth" component part and a "rough" component part. The "smooth" part of the decomposition is a sort of local average, while the "rough" part contains the fine details. The "smooth" part of a decomposition level may be further decomposed to produce an additional higher level set of "smooth" and "rough" parts corresponding to a greater length scale. This operation can be further repeated to produce a series of decomposed wavelet components corresponding to different length scales, and comprising a highest order smooth component, and one or more rough components associated with each decomposition level. It is notable that the highest order smooth component corresponds to the $n^{th}$ decomposition level, where n is the total number of decomposition levels. Repeating each decomposition step also results in decimation by a factor of 2 (using only every second point). The "smooth" and "rough" parts thus have half of the points of the original, adding up to the original number of points, to within edge effects. This means that the decomposition has enough information in it to reconstruct the original, which is also true for repeated decomposition steps.

Figure 2:
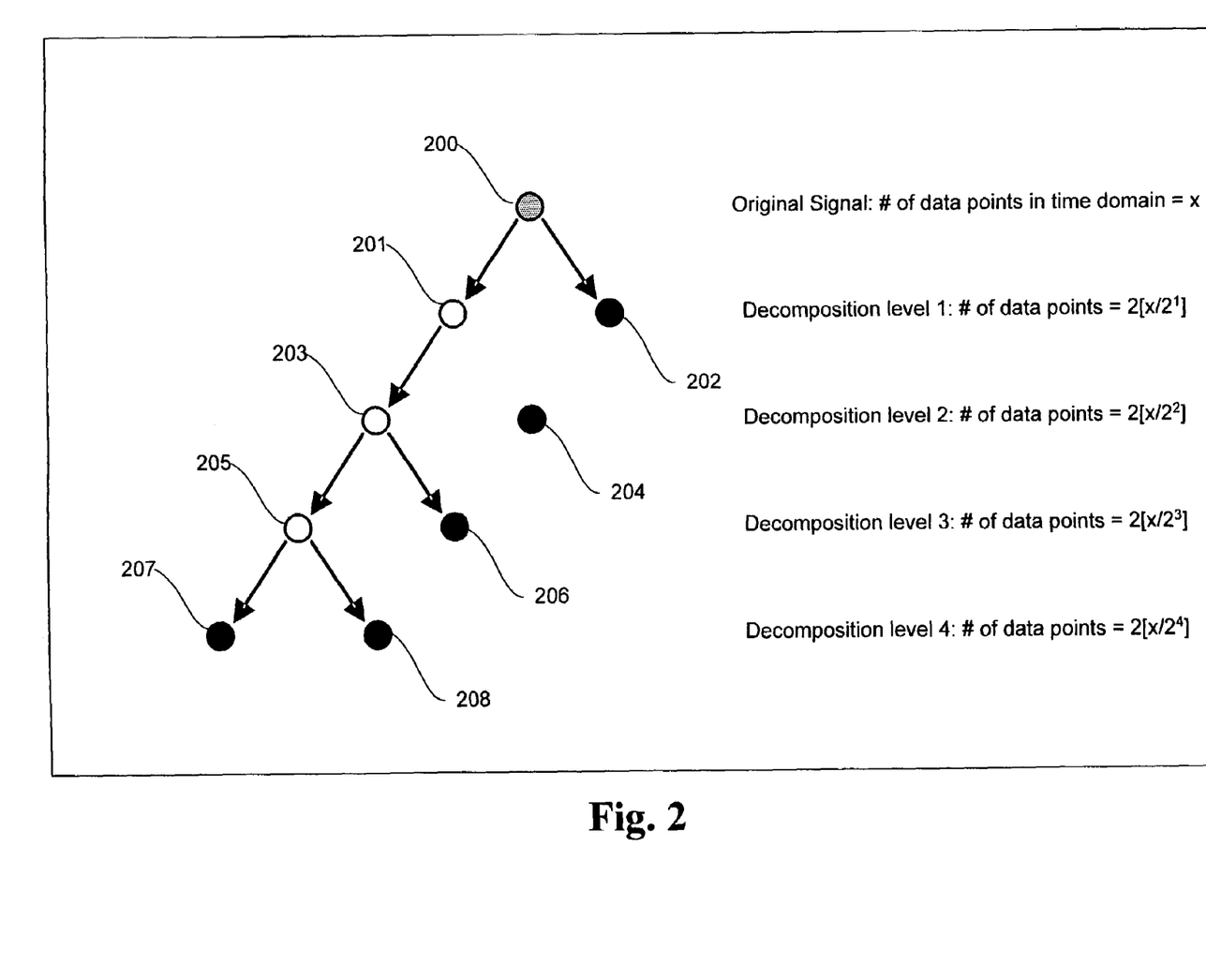
FIG. 2 is a schematic view of an exemplary four-level discrete wavelet decomposition of data.

An illustrative example of a four-level decomposition is shown in FIG. 2. The original signal is indicated at 200, which is decomposed at a first level to produce a smooth component 201 and a rough component 202. At a second decomposition level, the smooth component 201 is further decomposed to produce a smooth component 203 and a rough component 204. At a third decomposition level, the smooth component 203 is further decomposed to produce a smooth component 205 and a rough component 206. And finally at a fourth decomposition level, the smooth component 205 is further decomposed to produce a smooth component 207 and a rough component 208. For this four level decomposition, the smoothest scale (i.e. $4^{th}$ level smooth component 207) has the number of points reduced by a factor $2^4$ or 16. A four level decomposition results in $[x/(2^4)+x/(2^4)+x/(2^3)+x/(2^2)+x/(2^1)]$ or x number of data points in the wavelet domain. As a result, the discrete wavelet transform retains the same number of the data points as in the time domain.

For the higher decomposition levels, accompanying such data point reduction is the elimination of certain high frequency noise. Since the signals are mostly embedded in the higher decomposition levels, the lower decomposition levels can be ignored with little or no loss. In other words, noise is effectively reduced by retaining only the highest order decomposed components, beginning with the smoothest, i.e. $4^{th}$ level smooth component 207 in FIG. 2, since most of the noise is in the rough components. While not all possible combinations of mother wavelet types and different numbers of decomposition levels for each wavelet setting have been explored, results from experiments conducted by Applicants for the Lawrence Livermore National Lab suggest that the smoothest level of such decomposition essentially captures most of the clean target information. For example, a four-level Daubechies-2 decomposition is very effective for addressing gas chromatography (GC) type of signals. For such GC signals, using the smoothest wavelet component contains most of the real signal sufficient, and yielding a 16-fold reduction in the amount of the data for the neural network to learn. This is due to the similarity between Daubechies-2 wavelet and some of the key GC features in our data. In particular, the four-level decimated Daubechies-2 wavelet transform has a shape similar to the Gaussian with exponential tail characteristic of GC peaks. And there are only four points to describe the mother wavelet, so it is computationally much less demanding than other higher order choices.

Because most instruments have smooth outputs in a noise free environment, using just the first or the first few levels of wavelet preprocessing to eliminate noise is not restricted only to GC data types. Thus it is appreciated that the present invention is also applicable for denoising data from other types of equipment generally. This points to the importance of choosing an optimal wavelet transform. The more closely the resemblance between the mother wavelet and the features of the signals, the more "smooth" will the resulting smooth transforms and thus easier for the neural networks to extract the signatures. There are some families of wavelet that are well-adapted for working with discrete data, notably the orthogonal Daubechies, mentioned above, and the Coifman families and some biorthogonal ones. Their (bi)orthogonality makes reconstruction very simple. It is appreciated that orthogonality is a property which greatly simplifies the reconstruction part of a transform. Orthonormal bases may not be available for every type of application. In such cases, a generalized version using biorthogonal bases can often be used. In these particular wavelet families, the higher-index mother wavelets have more oscillations in them than the lower-index ones, meaning that it may be possible to choose a mother wavelet appropriate for the sort of signals that one is working with. Simple peaks may require only low-order wavelets, which approximate such a shape, while oscillatory data may require high-order wavelets. In contrast, it is notable that mother wavelets commonly used in continuous wavelet transform (CWT) analysis often lack convenient reconstruction algorithms in the case of discrete data points, which is what one has to work with in the "real world", as opposed to abstract mathematics. Two examples of such common wavelets is the Mexican Hat wavelet and the Mortlet wavelet. In any case, various types of mother wavelets may be chosen, depending on the application and the ideal signal shape found in such application.

Figure 3:
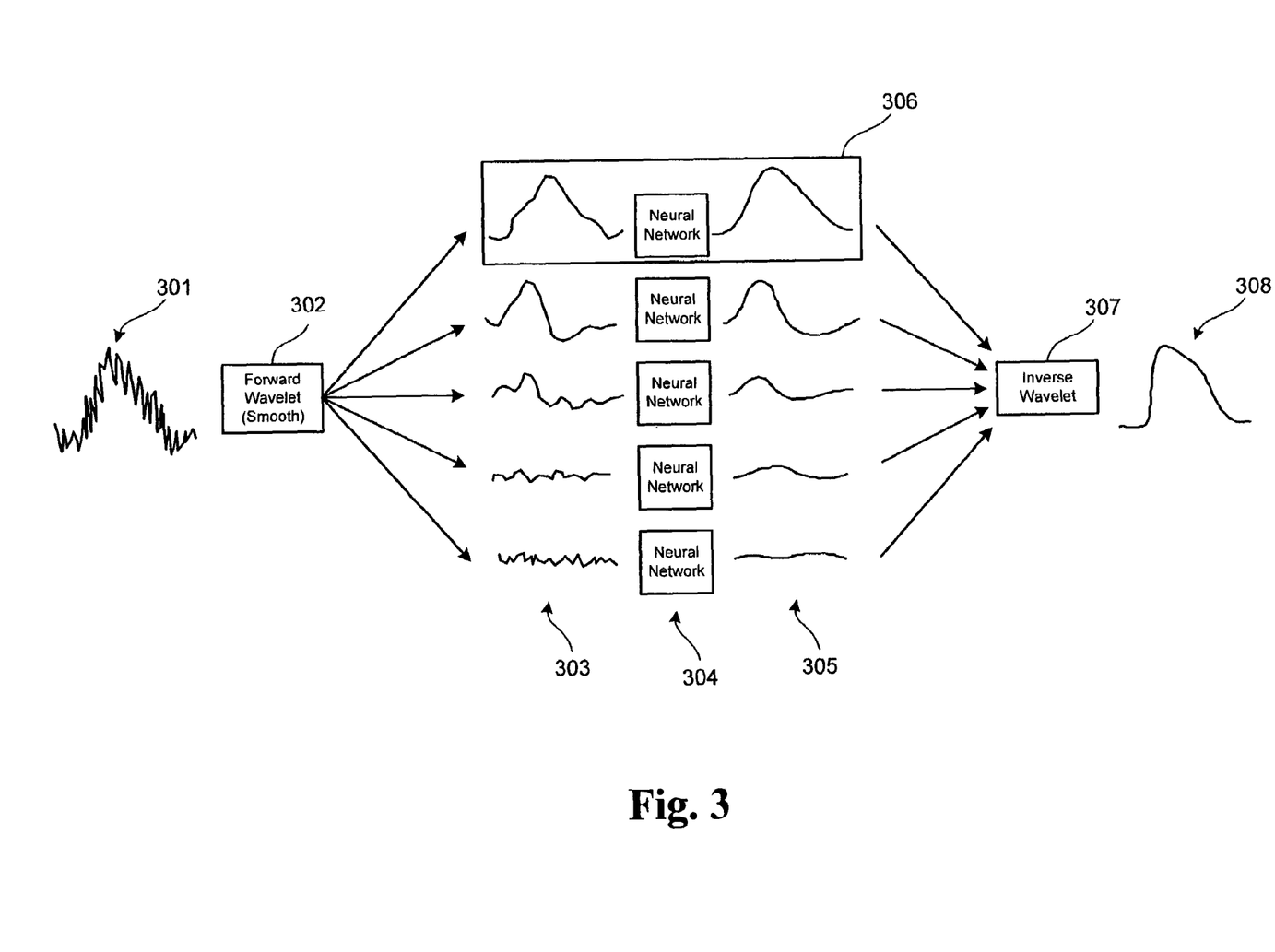
FIG. 3 is a schematic view graphically depicting the procedural flow of the signal preprocessing operation of FIG. 1.
Figure 4:
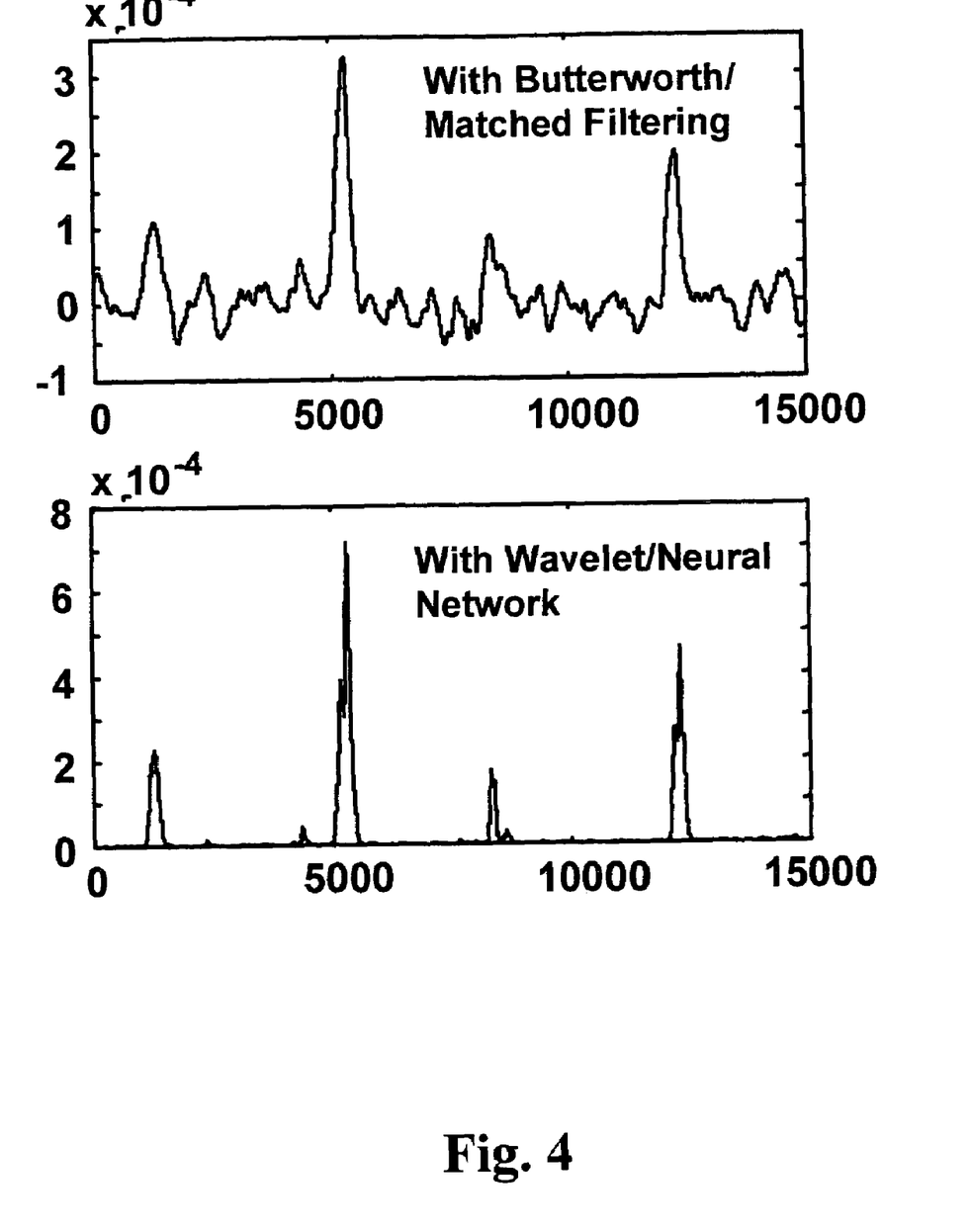
FIG. 4 is a comparative view of two graphs showing recovered gas chromatographic peaks from noisy data using Butterworth/matched filtering and wavelet/neural net filtering of the present invention.

In addition to the highest order smoothest wavelet component, additional rough components, beginning with the highest order, may also be retained for use as input into corresponding neural networks. If every level is kept, then such discrete wavelet preprocessing purely acts as a decomposition mechanism to assist pattern recognition by partitioning the data to allow the use of multiple neural networks and that it does not serve any purpose for denoising. FIG. 3 shows a schematic view of the decomposition of a signal into multiple wavelet components layers. As shown, a signal 301 is passed through a forward wavelet transform 302 where the decomposition takes place. Decomposed components are produced as indicated at 303, with the top layer shown as the smoothest component. Each of the parsed signals are then passed into a corresponding neural network, indicated at 304, to produce corresponding outputs 305 in the wavelet domain. The outputs are then combined at an inverse wavelet transform 307 where the signal is returned to the time domain as signal 308. The top level which is shown enclosed in a box indicates the use of only the smoothest component as input into a corresponding neural network. In the alternative, additional rough wavelet components may be used in conjunction with additional neural networks. It is appreciated that while use of just smoothest level decomposition may work for oversampled situations (with a high data rate), additional rough wavelet components may be retained and used depending on the data rate. For lower data rates or targeted data that fluctuates more substantially, additional rough components may be required, including additional corresponding neural networks, to handle such inputs because just one level of decomposition may not be able to capture the intended signals. In this regard, the present invention also enables the flexibility to choose the number of levels to decompose the incoming data stream, as well as to choose the number wavelet components to retain for further processing. This progressive technique has the advantage of selectively trading off computation time and complexity versus signal extraction accuracy, and gives a user a greater handle on the course of action to be taken. For example, if one needs to add the next-smoothest level into the process, then the amount of computation will approximately double—that next level is the same length of the smoothest one. As shown by the example of FIG. 2, the computational requirements are not linear with the added levels but geometric, increasing as powers of 2. For example, the computational load for adding a second rough component 206 (i.e. a third retained wavelet component in addition to the $n^{th}$ order smooth component 207, and the $n^{th}$ order rough component 208) level will again double because the third retained wavelet component has a computational load equal to the first and second retained wavelet components (207, 208) combined.

The down sampling of the incoming signal by discrete wavelet processing (i.e. decomposition of a signal into multiple wavelet components) is also advantageous to the neural networks, because while applying or deploying the neural system is extremely fast, the training of a neural network before deployment does take time. For example, at the highest order decomposition level for a 4-level decomposition, a reduction of the number of data points by a factor of 16 will actually reduce the training time by more than a factor of 16, because the smoother sub-sampled data is more noise free, meaning that will take less time to train for the recognition of the signal—in addition to the effect of the dataset size being smaller. For the next order wavelet component below the smoothest, again we also have a factor of 16 advantage in data reduction, but this composition is less smooth. And the next order wavelet component will have a reduction of data points by a factor $2_3$ or 8.

In this manner, discrete wavelet transform (DWT), serves three different purposes. First, it provides a means to segment the data in a way that enables time-saving progressive processing. Second, since signals most often occur within the smoother scales, which were decimated repeatedly by the DWT process, such decomposition enables automatic data reduction. And third, the smoothness of the lower scales allows neural networks to perform better in those wavelet component domains by rejecting certain amount of noise before the intermediate signal is then passed onto the neural networks for the purpose of extracting the relevant patterns. Cleaner signals bring out the features more clearly and thus easier for the neural networks to recognize. In other words, the transform provides a way to "transfigure" the data into a domain that favors neural network processing.

With respect to step 102, each of the retained wavelet component or components is then processed by its own corresponding neural network. An important point is that the neural network processing here does not process data in the time domain but within the wavelet domain to take advantage of both smoothness of the signals and the data reduction in the smoother scales. The neural networks are inserted in the middle of the two transforms between the forward transform at step 101 and the inverse transform at step 103, so they work in the wavelet domain instead. Such insertion technique cannot be blindly used for other types of transforms. This works well only for the case of wavelet transforms and possibly not for the Fourier transforms because the wavelet transform preserves the peak shape whereas Fourier transform not only does not preserve the shape but it also increases the entropy of the waveforms after forward transformation. This can make it even harder for the neural networks to learn the key features. As a result, such combination of wavelet and neural network is uniquely design to tackle the problem.

Secondly, by using or allowing more than one neural network, separate neural networks may handle separate decomposed wavelet signals representing different scales, and thereby avoid overtaxing any one of the neural networks. While neural network can learn almost any signatures, by using simpler neural networks enabled by the division of pattern recognition over multiple neural networks, the system is able to generalize and better recognize the buried signal's signatures more effectively. This is because the degrees of freedom are fewer and thus the ability to generalize improves with fewer degrees of freedom. This allows a progressive system that enables selective trade off between computational complexity and accuracy. It is appreciated that because of the adaptiveness of neural networks, the wavelet preprocessing need not be precisely tuned for absolute optimal denoising. The two systems overlap and thus yield a more flexible or "forgiving" signal processing.

The function of each of the neural networks is to extract relevant features from a corresponding wavelet component that it previously learned during the training process. Thus prior to deploying the system, training must be performed on the neural network to enable pattern recognition in the wavelet domain. The training tunes the neural network to recognize certain common features that would occur in the targeted signals, i.e. each of the retained wavelet components. Using a cleaned-up waveform to extract the desired signal would be much easier for the neural network. The highest order smooth wavelet component retained from the noisy raw data and the cleaned-up targeted data are used as a training pair for the supervised training of each neural network. Training of neural networks has been done by a variety of means, but the configuration described here and related configurations are most commonly trained with backpropagation or "backprop" for short. It starts with a measure of the neural network's error, usually the sum of the squares of the differences between the desired output values and those calculated with the neural network, the same as would be done in least-squares fitting. Some training algorithms can start with this error directly, but more efficient algorithms become available when one finds the gradient of the error with respect to the weights. This gradient is found with the help of the chain rule, which goes backwards in the neural-network architecture until it finds the weights, thus the name "backpropagation". Preferably a projection neural network is used in the present invention. A projection neural network projects the original input vectors into a space with one higher dimension before feeding the projected vectors into a single-hidden-layer feed-forward backpropagation neural network. And a modified Logicon projection system is preferably used for this processing. When considering the computational load when a system is deployed in the field, full-scale wavelet transforms are computationally demanding. While training a neural network may be even more demanding, deploying neural networks is computationally simple because neural network processing is highly asymmetrical. In deployment, a neural network typically does not have to learn, which is a time consuming iterative process, and thus it can execute its computations very fast. It is appreciated that all neural networks can work in a totally parallel fashion to increase the processing speed. This combination minimizes the demand of CPU time or hardware when one deploys the algorithm out in the field.

At step 103 of FIG. 1, all the output results from the neural networks are then inverted and reassembled through an inverse wavelet transform back into a clean signal in the time domain. In this manner, a clean signal is produced at the end of the pre-processing.

The method and system of the present invention should be generally applicable to a variety of chemical analysis equipment. The current method, with proper calibration, works on any one-dimensional array, so spectra as well as chromatograms are treatable. Extensions to two-dimensional data (e.g., spectra versus time, as in GC/MS) are possible. Also, the technique of the present invention is extendable to 2D data (e.g. images) or even higher dimensions. It is expected that adding extra dimensions will actually help the neural network perform even better because of the additional constraints or hints provided from the added dimension(s) of data. The computation load for the neural network will go up as the power of the dimension and the number of data points in the wavelet domain. However, here also, the number of data points in the wavelet domain will also be reduced by the same power due to the use of decimation. For example, for N data points in a 1-D signal, a four level decimated wavelet transform will have N/16 points for the neural network to process if we only include the smoothest level. Now if there are N data points in each of the dimensions in a 2-D image, then the number of data points to be processed in the neural network will be $(N/16)^2$ or $N^2/256$. So the use of decimation through wavelet preprocessing really helps to reduce the computational load. And because of the asymmetric nature of neural network processing, the more computationally demanding learning phase can be done offline.

Using the technique of the present invention, it is possible to reliably extract, for example, gas chromatographic (GC) peaks at signal-to-noise levels substantially less than one. This method has demonstrated at least a tenfold improvement over more conventional methods based on running averages and a low-pass analog filter. The application of the present invention to GC peaks is illustrative of the broad range of analytical detection devices which may benefit from this technique. The present invention may be implemented as software in an existing data processing/analyzing system, or embodied as hardware, firmware, or the like, such as a signal-processing chip (ASIC, full-custom, or DSP) for real time processing, especially when handling the enormous amount of data that some 2-D or 3-D high-resolution sensors collect.

Figure 5:
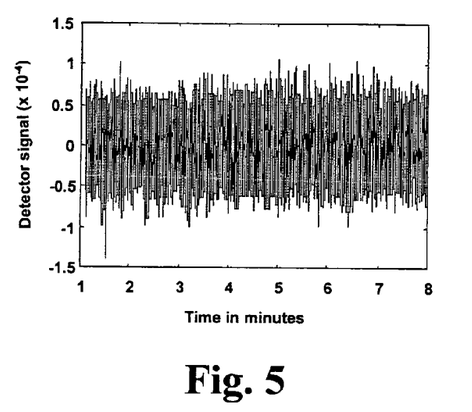
FIG. 5 is a graph showing unfiltered data @ 1 kHz with 3-pt running average, used to compare conventional methods of data processing and the wavelet-neural network method of data processing of the present invention.
Figure 6:
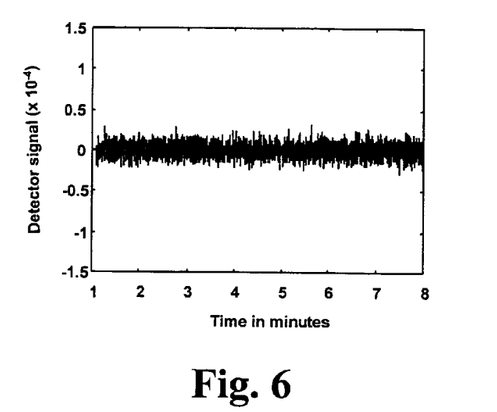
FIG. 6 is a graph following FIG. 5 after applying the wavelet denoising component of the present invention.
Figure 7:
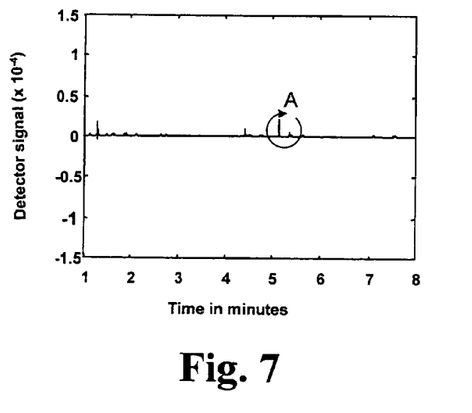
FIG. 7 is a graph following FIG. 6 after additionally applying the neural network pattern recognition component of the present invention.
Figure 8:
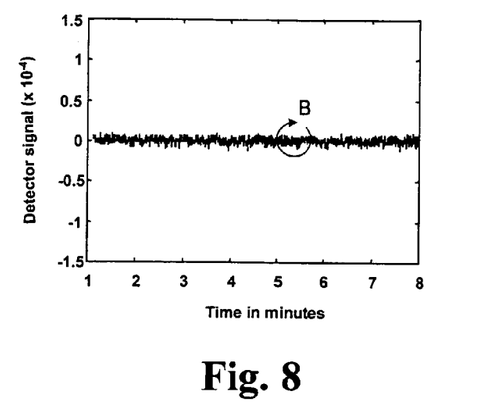
FIG. 8 is a graph showing the data of FIG. 5 after conventional filtering.
Figure 9:
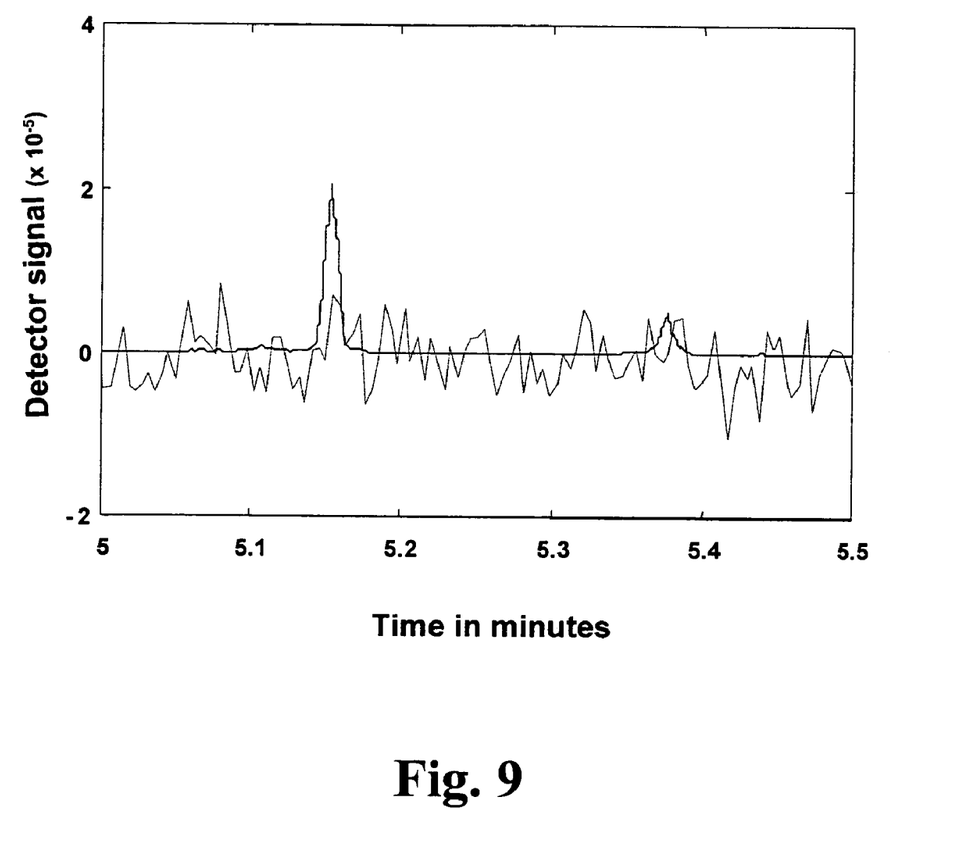
FIG. 9 is a graph showing a magnified comparison of circle A in FIG. 7 and circle B in FIG. 8, comparing the wavelet-neural network method of data processing and conventional data processing.
Figure 10:
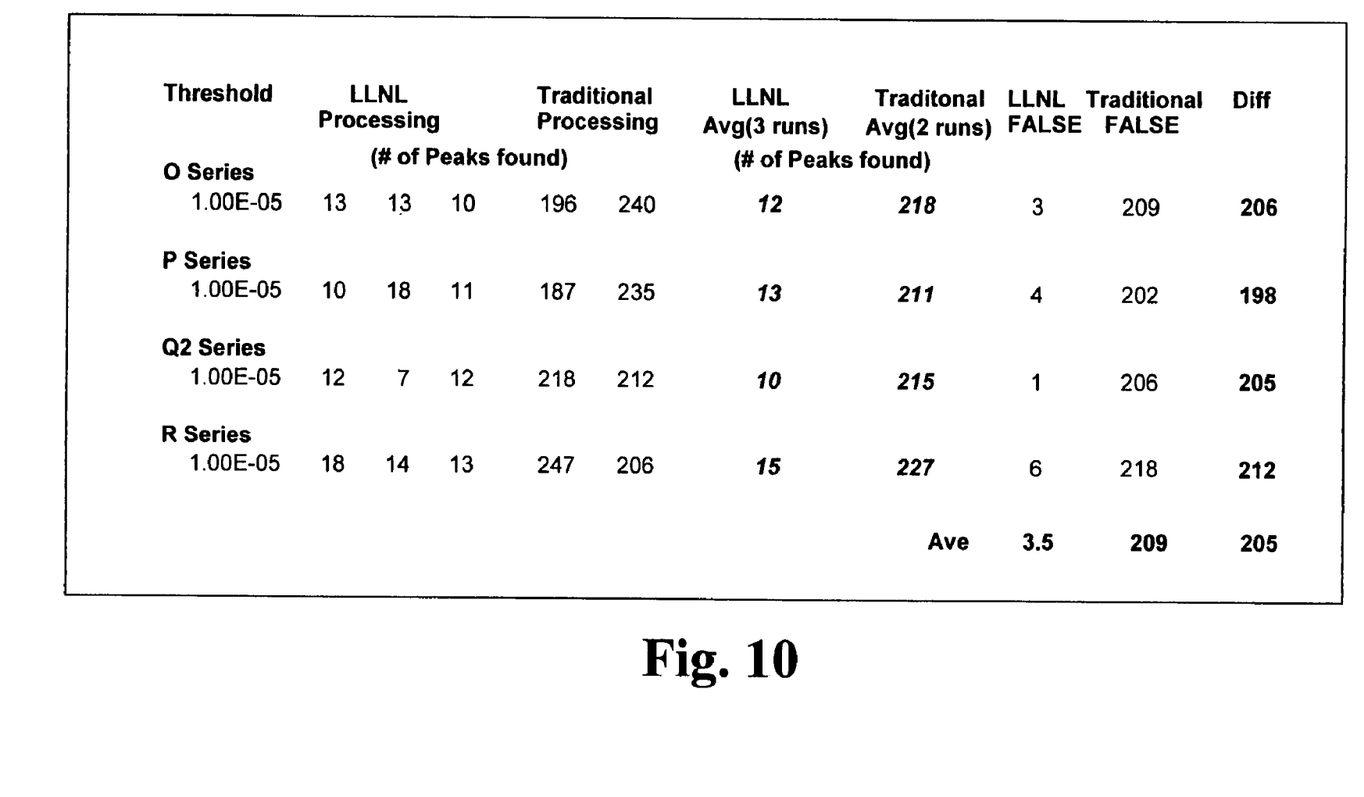
FIG. 10 is a table comparing the number of peaks found and the number of false peaks detected for the four calibration runs using the technique of the present invention versus certain standard algorithms commonly used in GC.

A test matrix was constructed to determine the factor of improvement in detection sensitivity and the reliability of detection using the wavelet-neural network signal processing algorithms. The first part of the test matrix consisted of seven calibration solutions having a 200-500 fold range in concentration of each of the target compounds. The lowest concentration turned out to be lower than the detection limit ultimately achieved by the present invention based on our current height threshold for detection, and one intermediate-concentration solution was rejected from regression as statistical outlier, likely a result of detector drift. Consequently, the calibration was based on five solutions. The second part consisted of 5 blind samples having various concentrations of the calibrated compounds, with some nulls, and two spikes of a blind compound (Amiton) near its suspected detection limit. The complete comparison process is shown for one sample near the detection limit in FIGS. 5-10. In particular, FIG. 5 shows a graph of unfiltered data @ 1 kHz with 3-pt running average, used to compare conventional methods of data processing and the wavelet-neural network method of data processing of the present invention. FIG. 6 is a graph following FIG. 5 after applying the wavelet denoising component of the present invention. And FIG. 7 is a graph following FIG. 6 after additionally applying the neural network pattern recognition component of the present invention. FIG. 8 is a graph showing the data of FIG. 5 after conventional filtering. As shown in FIG. 9 comparing the wavelet-neural network method of data processing and conventional data processing, the wavelet/neural network processing technique of the present invention extracted more signal out of the peak (more sensitive) and at the same time minimize false peaks as evidenced by the clean noise floor. By comparison, the more traditional algorithm produced many false peaks that could trigger false alarms. FIG. 10 is a table comparing the number of peaks found and the number of false peaks detected for the four calibration runs using the technique of the present invention versus certain standard algorithms commonly used in GC. For the four series of calibration runs, the present invention produces on average only 3.5 false peaks vs. 209 false peaks using the standard algorithm. We have 5 compounds resulting in 6 peaks because one is a doublet and three solvent peaks.

An obvious question is how well this method compares to other methods. Much of the noise is high frequency, so a simple multiple-point running average can improve the signal-to-noise ratio several fold, although peak broadening is produced by this approach and thus may affect the exact peak positions. Even more noise reduction can be achieved with more sophisticated filtering. We chose a Butterworth/matched filters combination for comparison. A Butterworth filter has a smooth response and relatively gentle rolloff compared to other filters, such as the Chebyshev filter, and our parameter settings were chosen so the Butterworth filter acted as a lowpass filter. A comparison of signal recovery using the Butterworth/matched filtering and the wavelet-neural network method is shown in FIG. 5. Although the four peaks were resolved by the Butterworth/matched filters combination, the doublets of the two peaks at ~5000 and ~12500 were not resolved by it, even though they were made visible using the technique of the present invention. In addition, the poor noise floor from the Butterworth/matched filters would lead to false peak detection.

In an alternative embodiment, a predetermined transform may be utilized to decompose a signal to a plurality of signal components in the transform domain. Each of these signal components are then inputted into corresponding neural networks pretrained to recognize patterns in the specific component in the transform domain to achieve the benefits and advantages described above related to such neural network processing in the transform domain. Afterwards, an inverse transform is applied to recover the signal back into the time domain. It is appreciated that various methods of signal denoising may be performed, including thresholding known in the art, after decomposition step to improve the subsequent filtering in the neural network processing stage.

While particular operational sequences, materials, temperatures, arameters, and particular embodiments have been described and or illustrated, such are not intended to be limiting. Modifications and changes may become apparent to those skilled in the art, and it is intended that the invention be limited only by the scope of the appended claims.

We claim:
1. A signal processing method comprising:
receiving a signal corrupted with noise;
performing an n-level decomposition of said signal using a discrete wavelet transform to produce a smooth component and a rough component for each decomposition level;
inputting the $n^{th}$ level smooth component into a corresponding neural network pre-trained to recognize and extract substantially-noiseless ideal signal feature patterns from the $n^{th}$ level smooth component exclusively;
performing an inverse discrete wavelet transform on the substantially-noiseless ideal signal feature patterns extracted by the neural network to recover a clean signal, and
outputting the de-noised clean signal.

2. The signal processing method of claim 1, further comprising:
inputting the rough components of pre-selected decomposition levels into separate corresponding neural networks each pre-trained to recognize and extract substantially-noiseless ideal signal feature patterns from the corresponding one of the pre-selected rough components exclusively; and
performing an inverse discrete wavelet transform on the substantially-noiseless ideal signal feature patterns extracted by all the neural networks to recover a clean signal.

3. The signal processing method of claim 2,
wherein the rough components are pre-selected beginning in order with the highest decomposition levels.

4. The signal processing method of claim 2,
wherein the rough components of all decomposition levels are inputted into separate corresponding neural networks.

5. The signal processing method of claim 1,
wherein said signal has a Gaussian shape.

6. The signal processing method of claim 5, wherein said discrete wavelet transform is a Daubechies-2 wavelet transform.

7. The signal processing method of claim 6, wherein a four-level decomposition is performed using said Daubechies-2 wavelet transform.

8. The signal processing method of claim 1, wherein each of said neural networks is a projection neural network.

9. The signal processing method of claim 1, further comprising removing a baseline prior to performing the n-level decomposition of said signal.

10. A signal processing method comprising:
receiving a signal corrupted with noise;
decomposing the signal into a plurality of signal components using a predetermined transform;
inputting each of the plurality of decomposed signal components into a corresponding neural network pre-trained to recognize and extract substantially-noiseless ideal signal feature patterns from the corresponding one of the decomposed signal components exclusively, in the transform domain;
performing an inverse transform on the substantially-noiseless ideal signal feature patterns extracted by all the neural networks to recover a clean signal in the time domain, and
outputting the de-noised clean signal.

11. The signal processing method of claim 10, wherein the plurality of signal components are filtered to remove noise.

12. A system comprising:
a discrete wavelet transformer for iteratively decomposing a signal into a plurality of decomposition levels each having a smooth component and a rough component;
at least one neural network(s) corresponding in number to a set of pre-selected components comprising a highest-level smooth component and a predetermined number of rough components, each neural network operatively coupled to the discrete wavelet transformer to receive a corresponding one of the pre-selected components, and pre-trained to recognize and extract substantially-noiseless ideal signal feature patterns from the corresponding one of the pre-selected components exclusively; and
an inverse discrete wavelet transformer capable of recovering a clean signal in the time domain from the substantially-noiseless ideal signal feature patterns extracted by the plurality of neural networks.

13. The system of claim 12, wherein each of plurality of neural networks has been trained using noiseless signal data or ideal data derived from physical principle and such trained neural network after sufficient training will generalize its capability to recover signal from unseen corrupted data.

* * * * *